United States Patent [19]

Achelpohl et al.

[11] 4,331,502
[45] May 25, 1982

[54] APPARATUS FOR MAKING BAGS FROM A TWO-PLY WEB OF THERMOPLASTIC MATERIAL

[75] Inventors: Fritz Achelpohl; Friedhelm Mundus, both of Lengerich, Fed. Rep. of Germany

[73] Assignee: Windmöller & Hölscher, Lengerich, Fed. Rep. of Germany

[21] Appl. No.: 172,685

[22] Filed: Jul. 28, 1980

[30] Foreign Application Priority Data

Aug. 1, 1979 [DE] Fed. Rep. of Germany ....... 2931268

[51] Int. Cl.³ .............................................. B32B 31/18
[52] U.S. Cl. ................................. 156/515; 156/583.1; 156/583.5
[58] Field of Search .................. 156/515, 583.4, 583.5, 156/583.1

[56] References Cited

U.S. PATENT DOCUMENTS 3,551,259 12/1970 Schwarzkopf ..................... 156/515
3,838,631 10/1974 Simpson et al. ..................... 156/515
4,115,183 9/1978 Achelpohl et al. ................. 156/515

Primary Examiner—Caleb Weston
Attorney, Agent, or Firm—Fleit & Jacobson

[57] ABSTRACT

Parallel, spaced apart backing rods are carried by a rotating cylinder and serve the continuously supplied web. Back-pressure bars are extensible to engage and cooperate with welding bars. The backing rods and back-pressure bars are movable from and toward each other and provided with means for guiding a web with low friction. Those welding bars which are disposed near that sector of the cylinder in which the backing rods are disposed when they are retracted are moved concentrically to and at the same angular velocity as the back-pressure bars outside that surface of the cylinder over which the back-pressure bars are disposed. The back-pressure bars consist of rotatably mounted rolls, which are provided with a covering of elastic material which resists the welding heat. The welding bars have knife edge-like welding edges facing the rolls.

5 Claims, 5 Drawing Figures

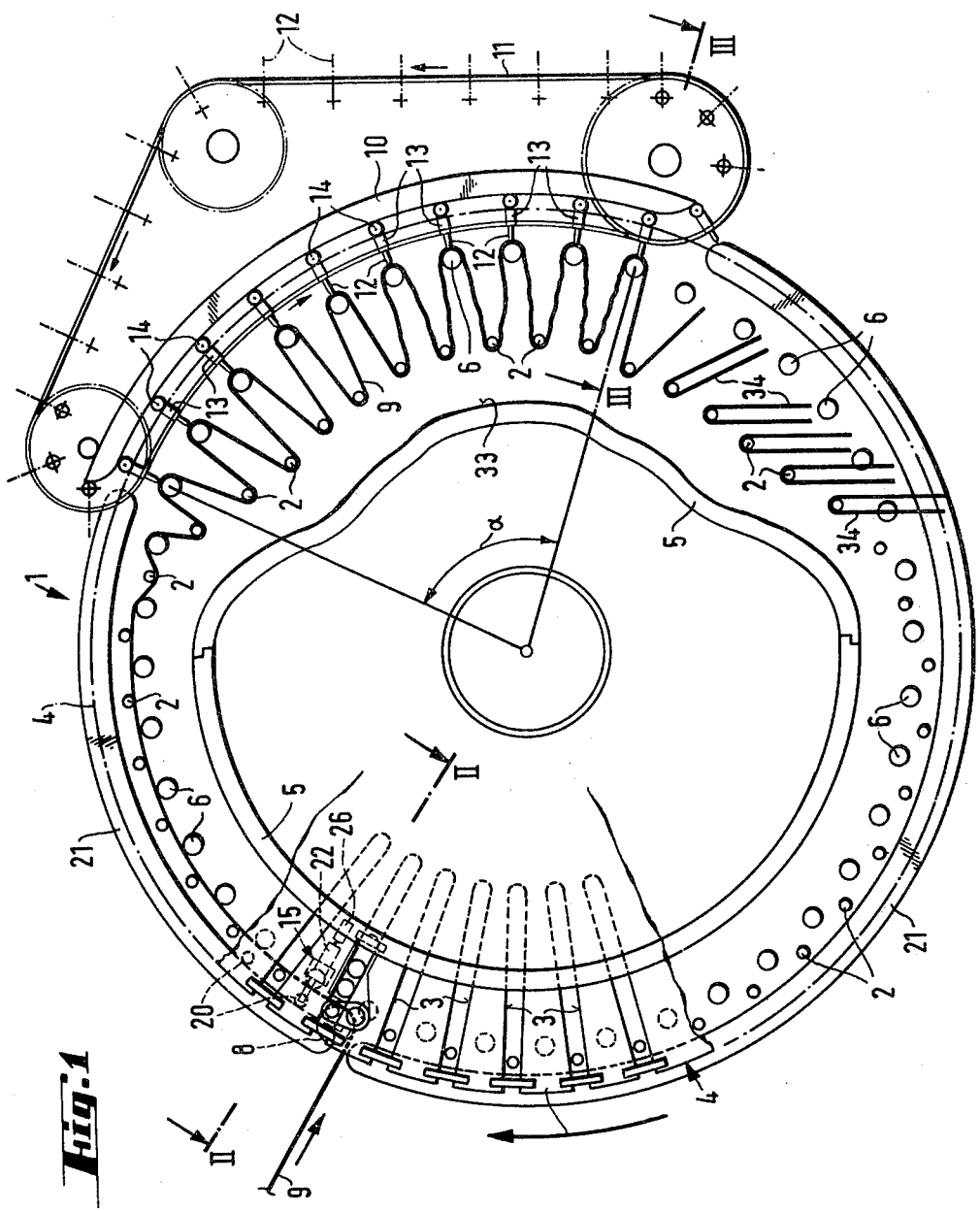

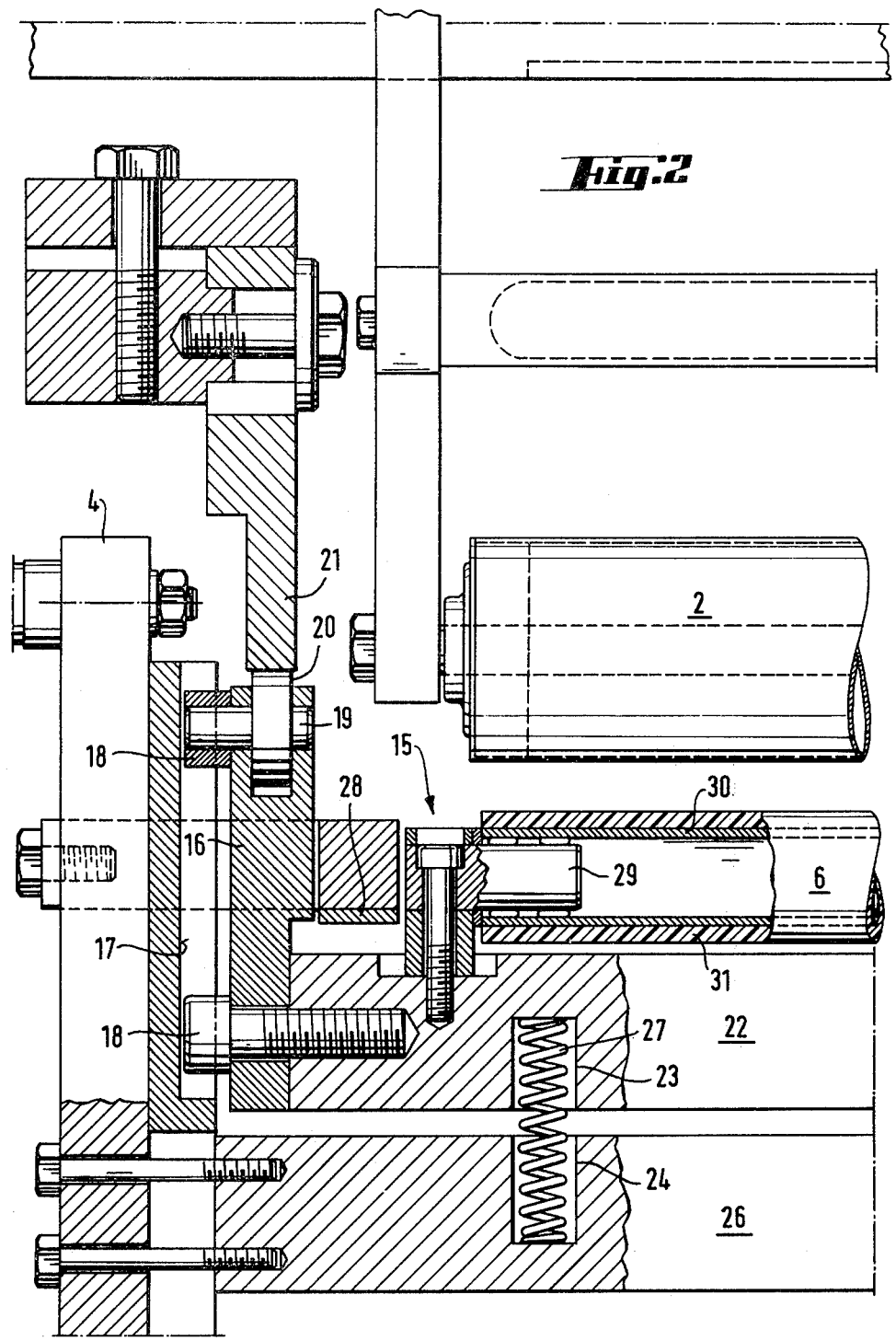

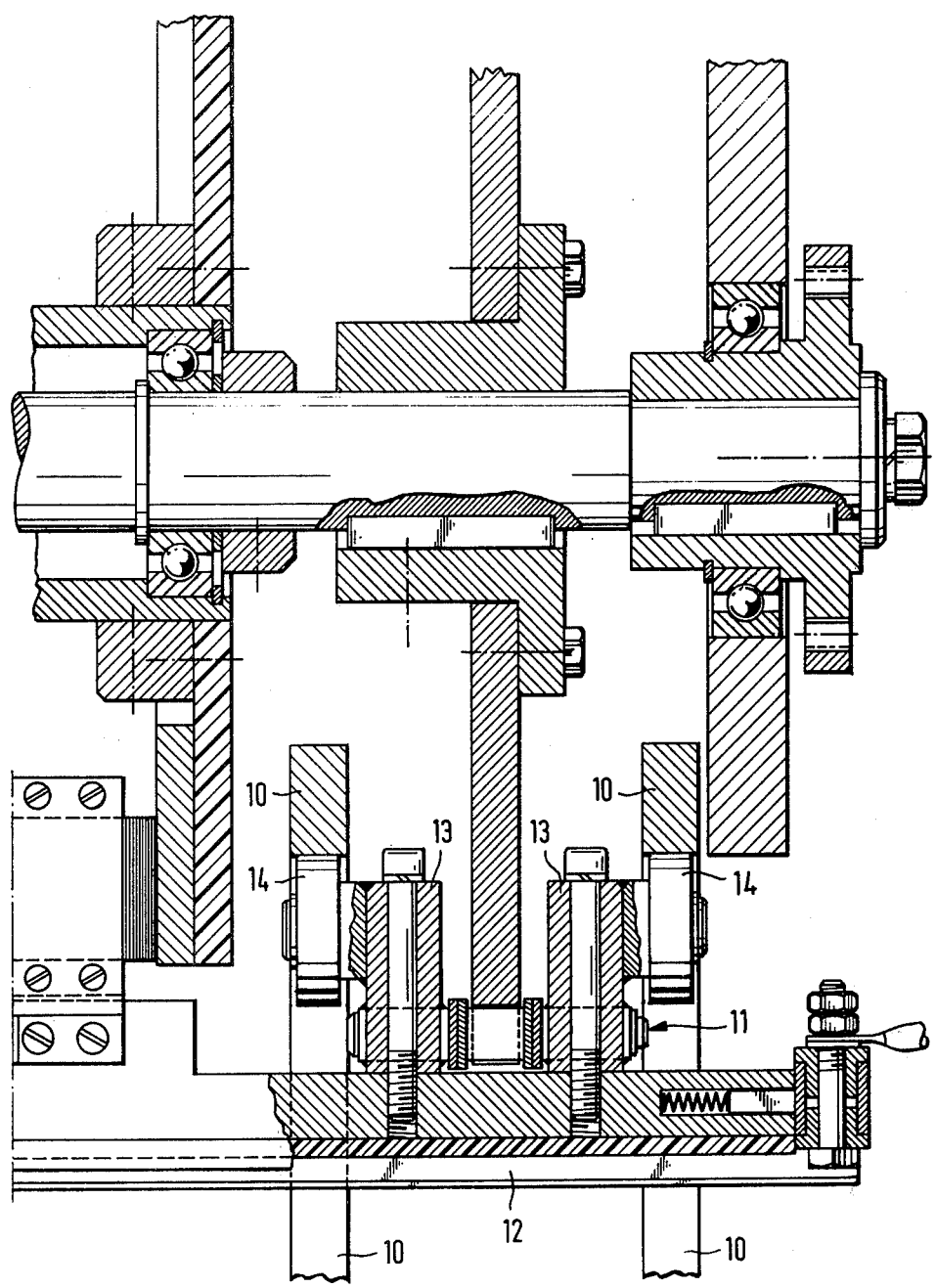

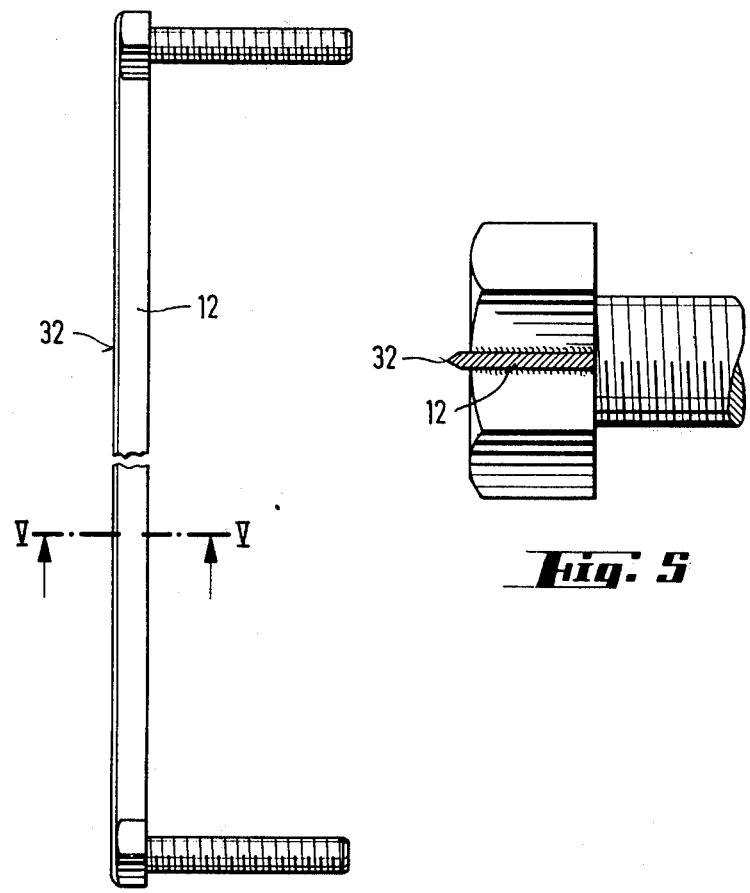

APPARATUS FOR MAKING BAGS FROM A TWO-PLY WEB OF THERMOPLASTIC MATERIAL

This invention relates to apparatus for making bags or tube sections from a two-ply web of heat-sealable or weldable material, comprising parallel, spaced apart backing rods carried by a rotating cylinder and serving to support the continuously supplied web, and a transverse welding and severing device having back-pressure bars which are extensible to engage and cooperate with welding bars, the backing rods and the back-pressure bars being movable from and toward each other to cause the web to extend between them in a zig-zag line and being provided with means for guiding the web with low friction, and those welding bars which are disposed near that sector of the cylinder in which the backing rods are disposed when they are retracted and in which the welding seams to be separated are made being moved concentrically to and at the same angular velocity as the back-pressure bars outside that surface of the cylinder over which the back-pressure bars are disposed, in accordance with U.S. Pat. No. 4,115,183 (hereinafter referred to as "the abovementioned patent).

In the apparatus according to the abovementioned patent, each back-pressure bar consists of a retaining bar having a knifelike blade, which is adapted to be forced against the end face of the heated welding bar in that portion of the sector of the cylinder in which the seam welds to be severed are to be made, rods which are parallel to the knifelike blade are disposed on opposite sides thereof, and rollers for guiding the web are rotatably mounted on said rods. These rollers reduce the friction and permit the web to be formed into a zig-zag shape as the backing rods are retracted.

In the apparatus according to the abovementioned patent, it has been found that the welding bars covered by a polytetrafluorethane woven fabric are subjected to increased wear because the knife edges of the knifelike back-pressure bars always impinge on the same areas.

For this reason it is an object to provide the apparatus according to the above-mentioned patent with a more durable transverse welding and severing device.

This object is accomplished according to the invention in that the back-pressure bars consist of rotatably mounted rolls, which are provided with a covering of eleastic material which resists the welding heat, and the welding bars have knife edge-like welding edges facing the rolls. In the apparatus according to the invention the back-pressure bars consisting of rotatable rolls serve not only to guide the web with low friction as the same is pulled to assume a zig-zag shape, so that there is no need for additional rods disposed on opposite sides of the back-pressure bars are provided with rollers, but each roll is abutted by the associated welding bar different generatrices of the roll during different welding operations so that the fact that random positions are assumed by the roll after every formation of the zig-zag shape ensures that the entire periphery of the roll will be used as an abutment and will thus be uniformly stressed and suffer virtually no wear.

The cover of the roller consists suitably of a silicone rubber cover and an overlying polytetrafluoroethane woven fabric.

According to a preferred further feature, the backing rods disposed adjacent to the sector in which the concentrically moved welding bars are disposed are moved toward the back-pressure bars by the cams which control the retracting movement of the backing rods. As the backing rods retracted to their inner end position are thus raised, the sheeting web held in a zig-zag shape is slackened so that the fresh seam weld will not be subjected to tension and will not be prematurely severed. Only when the seam welds have sufficiently cooled, the backing rods are moved back to their inner end position so that the web is subjected to tension adjacent to the knife edge-like welding edges and the sections provided at their ends with transverse seam welds are severed from the web.

According to another preferred embodiment of the invention, the bearings for the rolls are slidably mounted in radial guide grooves formed in the end discs of the cylinder and are provided with brackets, in which rollers are mounted, which run on cams arranged around the cylinder, prestressed compression springs are held between the bearings or carriers connected to said bearings, on the one hand, and the discs or brackets connected to said discs, which springs urge the rollers against the cams, and the cams are interrupted adjacent to the sector in which the concentrically moved welding bars are disposed, so that the rolls bear on the welding bars. This arrangement ensures that during the welding operation the rolls which constitute back-pressure bars will engage the knife edges of the welding bars under the pressure which is determined by the springs.

The combination of a knife edge-like welding bar with a welding roll which constitutes a back-pressure bar is known per se from German Pat. No. 2,309,719.

An embodiment of the invention will now be explained more fully with reference to the accompanying drawing, in which FIG. 1 is a diagrammatic view showing the welding cylinder, FIG. 2 is a sectional view showing through an end disc of the welding cylinder and a roll, which constitutes a back-pressure bar and is radially slidably mounted in the end disc, FIG. 3 is a sectional view showing the welding bar which is moved concentrically over a sector of the welding cylinder, FIG. 4 is a side elevation showing the welding bar consisting of a welding band and FIG. 5 is a sectional view showing the welding band of FIG. 4.

The end discs 4 of the welding cylinder 1 are formed with radial grooves 3, in which backing rods 2 are mounted to be radially slidable parallel to themselves. The backing rods 2 are axially extensible and retractable and are rotatably mounted in a radially slidable sliders. Guide members provided with cam follower rollers are secured to the sliders and guided in cam slots 5 which are fixed to the frame of the apparatus. By means of the cam slots 5, the backing rods are controlled to be radially retracted between the rolls 6, which constitute the back-pressure bars, when the rolls 6 have been pushed over the sheeting web 9 above the flight cylinder described by the rolls. The sheeting web 9 is supplied over the guide roller 8. In the above-mentioned patent it has been described more in detail how the sheeting web 9 is confined between the backing rods and the back-pressure bars before the backing rods are moved beyond the flight cylinder of the back-pressure bars to form the web into the zig-zag shape.

Cam rails 10 are disposed outside the welding cylinder 1 adjacent to the sector thereof which is indicated by the angle α and have curved cam faces, which are concentric with the cylinder. Welding bands 12 secured to endless chains 11 revolve around the curved cam face. The guide chains are provided with brackets 13, in which cam follower rollers 14 are mounted. The latter roll on the cam rails 10 and guide the welding bands 12 adjacent to said rails.

It is apparent from FIG. 2 that the bearings 15 for the rollers 6, which constitute the back-pressure bars, are screw-connected to guide members 16, which by means of sliders 18 are radially slidably guided in radial grooves 17 of the end discs 4. The forked upper end portion of the guide member 16 carries a pin 19, which carries the slider 18 and on which a cam follower roller 20 consisting of a ball bearing is mounted. The roller 20 runs on a cam face formed by an annular cam rail 21, which is fixed to the frame of the apparatus and surrounds the cylinder.

A bracket 22 is connected to the guide member 16 and has bores 23, which are aligned with bores 24 in a carrier 26 that is secured to the discs 4. The bores 23, 24 receive the ends of compression springs 27, which urge the cam follower rollers 20 against the cam faces of the cam rails 21. Adjacent to that sector of the cylinder which is bridged by the concentrically curved cam rails 10, the cam rails 21 are interrupted so that the springs 27 urge the rolls 6 against the welding bands 12, which are disposed radially outwardly of the cam rails 21 and revolve at the same velocity.

Stops 28 for limiting the radially outwardly directed movement of the rolls 6 are secured to the end discs 4.

The rolls 6 consist of tubes 30, which are mounted by means of needle roller bearings on journals 29 and carry a covering 31 consisting of silicone rubber and an overlying polytetrafluorethane woven fabric.

The welding bars 12 consist of welding bands, which are provided with knife edge members 32. These welding bands are supplied with welding current in known manner by way of sliding contacts.

In the intermediate portion of that sector of the welding cylinder 1 which is bridged by the concentrically curved cam rails 10, the backing rods 2 are moved toward the rolls 6 by the portion 33 of the cam slot 5 to slacken the web which is held in zig-zag shape between the backing rods 2 and the rolls 6. As a result of that slackening, the several sections which have been provided with seam welds and severed from the web cannot be separated from the web before the seam welds have been sufficiently cooled. Adjacent to the end of the concentrically curved cam rails 10, the cam slot 5 causes the backing rods 2 to be retracted so that the sections 34 provided at their ends with transverse seam welds are separated from the web 9.

What is claimed is:

1. Apparatus for making bags or tube sections from a two-ply continuously supplied web of heat-sealable or weldable material, comprising a rotatable cylinder, parallel, spaced apart backing rods carried by the cylinder and serving to support the continuously supplied web, and a transverse welding and severing device having back-pressure bars carried by the cylinder, and welding bars spaced from the cylinder, the back-pressure bars being extensible to engage and cooperate with the welding bars, the backing rods and the back-pressure bars being movable from and toward each other to cause the web to extend between them in a zig-zag line and being provided with means for guiding the web with low friction, and those welding bars which are disposed near that sector of the cylinder in which the backing rods are disposed when they are retracted and in which the welding seams to be separated are made being moved concentrically to and at the same angular velocity as the back-pressure bars outside that surface of the cylinder over which the back-pressure bars are disposed, characterized in that the back-pressure bars consist of rotatably mounted rolls, which are encompassed with a covering of elastic material which resists the welding heat, said rolls guiding the web with low friction and being rotated by passage of the web so that the entire periphery of each roll is used as an abutment thereby providing uniform stress of the roll covering, and the welding bars have knife edge-like welding edges facing the rolls.

2. Apparatus according to claim 1, characterized in that the covering consists of a silicone rubber covering and an overlying tetrafluorethane woven fabric.

3. Apparatus according to claim 1 or 2, further comprising cam means for controlling retracting movement of the backing rods, backing rods disposed adjacent to the sector in which the concentrically moved welding bars are disposed being moved toward the back-pressure bars by the cam means which control the retracting movement of the backing rods.

4. Apparatus according to claim 3 further comprising:
    bearing means for supporting said rolls;
    guide means connected to said bearing means for guiding movement of the bearing means;
    radial guide grooves formed in end discs of the cylinder; and
    said guide means including guide members carrying sliders disposed in said guide grooves for guiding movement of the bearing means, an annular cam fixed to a frame of the apparatus around the circumference of the cylinder, rollers carried by said guide members engageable with said annular cam, biasing means for urging said rollers into engagement with said annular cam, said annular cam being interrupted adjacent to the sector in which the concentrically moved welding bars are disposed, so that the rolls bear on the welding bars.

5. Apparatus according to claim 1 or 2 further comprising:
    bearing means for supporting said rolls;
    guide means connected to said bearing means for guiding movement of the bearing means;
    radial guide grooves formed in end discs of the cylinder; and
    said guide means including guide members carrying sliders disposed in said guide grooves for guiding movement of the bearing means, an annular cam fixed to a frame of the apparatus around the circumference of the cylinder, rollers carried by said guide members engageable with said annular cam, biasing means for urging said rollers into engagement with said annular cam, said annular cam being interrupted adjacent to the sector in which the concentrically moved welding bars are disposed, so that the rolls bear on the welding bars.

* * * * *